US008781094B2

(12) United States Patent
Ramanathan et al.

(10) Patent No.: US 8,781,094 B2
(45) Date of Patent: Jul. 15, 2014

(54) CONTEXTUAL CALL ROUTING BY CALLING PARTY SPECIFIED INFORMATION THROUGH CALLED PARTY SPECIFIED FORM

(75) Inventors: Rajesh Ramanathan, Redmond, WA (US); Eran Shtiegman, Redmond, WA (US); Amritansh Raghav, Seattle, WA (US); Dena Osherovich, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1527 days.

(21) Appl. No.: 12/015,086

(22) Filed: Jan. 16, 2008

(65) Prior Publication Data

US 2009/0180602 A1 Jul. 16, 2009

(51) Int. Cl.
*H04M 3/42* (2006.01)
(52) U.S. Cl.
USPC ............ 379/211.01; 379/201.01; 379/201.02; 379/211.02
(58) Field of Classification Search
USPC ........ 379/201.01, 88.11, 88.12, 88.18, 88.22, 379/142.01, 142.1, 201.02, 211.01
See application file for complete search history.

(56) References Cited

U.S. PATENT DOCUMENTS

| | | | |
|---|---|---|---|
| 5,664,207 A * | 9/1997 | Crumpler et al. | 715/229 |
| 5,774,534 A * | 6/1998 | Mayer | 379/142.01 |
| 6,233,332 B1 * | 5/2001 | Anderson et al. | 379/265.09 |
| 7,023,980 B2 | 4/2006 | Lenard | |
| 7,072,457 B2 | 7/2006 | Brown et al. | |
| 7,203,294 B2 * | 4/2007 | Carnazza et al. | 379/142.07 |
| 7,277,697 B2 * | 10/2007 | Desai et al. | 455/416 |
| 2002/0085701 A1 * | 7/2002 | Parsons et al. | 379/211.01 |
| 2002/0090064 A1 * | 7/2002 | Burg | 379/67.1 |
| 2003/0179743 A1 | 9/2003 | Bosik et al. | |
| 2004/0203664 A1 * | 10/2004 | Lei et al. | 455/414.1 |
| 2004/0208305 A1 * | 10/2004 | Gross et al. | 379/211.01 |
| 2006/0010206 A1 | 1/2006 | Apacible et al. | |
| 2006/0056612 A1 * | 3/2006 | Ju et al. | 379/201.01 |
| 2007/0047522 A1 * | 3/2007 | Jefferson et al. | 370/352 |
| 2007/0081640 A1 | 4/2007 | Jachner | |
| 2007/0153997 A1 | 7/2007 | Shang | |
| 2007/0201661 A1 | 8/2007 | Fullarton et al. | |
| 2007/0293212 A1 * | 12/2007 | Quon et al. | 455/420 |
| 2008/0130845 A1 * | 6/2008 | Bose et al. | 379/93.07 |
| 2008/0170678 A1 * | 7/2008 | Davoust et al. | 379/201.01 |
| 2009/0131080 A1 * | 5/2009 | Nadler et al. | 455/456.3 |

OTHER PUBLICATIONS

Enhancing Enterprise Communications Systems with Wireless Devices and Presence Information (5 pgs.) http://www1.cs.columbia.edu/~knarig/avaya.pdf.
Personalization of Internet Telephony Services for Presence with SIP and Extended CPL (12 pgs.) http://www.site.uottawa.ca/~luigi/Daners/06_jiang_liscano_logrippo.pdf.

* cited by examiner

*Primary Examiner* — Khai N Nguyen
(74) *Attorney, Agent, or Firm* — Andrew Smith; Micky Minhas (57) ABSTRACT

Context-based call routing is provided in a unified communication system by enabling subscribers to define a routing document, which is published by the communication system to callers who subscribe to a presence of the called party. Through publication of the context-based routing information, callers are enabled to make selections between call destination options as defined by the caller and provide a subject for the requested call. The call is then routed by the system according to the caller selection allowing efficient facilitation of the communication between the caller and the called party or their designees.

20 Claims, 6 Drawing Sheets

CONTEXTUAL CALL ROUTING BY CALLING PARTY SPECIFIED INFORMATION THROUGH CALLED PARTY SPECIFIED FORM

BACKGROUND

With the proliferation and development of various telecommunication technologies, getting a busy signal or no answer is becoming almost extinct. Many technologies allow calls to be forwarded to voicemail systems, other human parties, and so on, allowing callers to reach the called party eventually in one form or another.

A typical use of such systems is in service industry, where callers are first greeted by an automated system presenting questions and determining a proper destination for the call based on voice-recognized responses or Dual Tone Multi-Frequency (DTMF) entries by the calling party.

Many such systems are, however, static—i.e. based on a set of predetermined rules that are not modified frequently or based on calling party. Thus, for the calling party the system offers a one-size-fits-all kind of blunt approach, which is not the most efficient method for addressing the calling party's needs. For the called party, conventional systems lack the flexibility to enable the called party to make himself/herself available to particular callers in an efficient and dynamic manner. Furthermore, such systems are typically geared toward voice-based communication methods and cannot take advantage of currently evolving multi-modal unified communications, which enable users to communicate via various modes with the help of comprehensive user interfaces.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to providing context-based call routing by enabling subscribers to define and modify a routing document, which is published by the communication system to callers who subscribe to a presence of the called party. Through publication of the context-based routing information, callers are enabled to make selections between call destination options as defined by the caller. The call is then routed by the system according to the caller selection allowing efficient facilitation of the communication between the caller and the called party.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly discussed above, calls may be routed in a context-based manner by enabling called parties to define and modify context-based routing documents, publishing those to callers who subscribe to the presence of the called party, and facilitating placed calls, where the caller makes selections for call destination and context information based on the published information. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

The term "call" as used herein should not be interpreted as being limited to voice communications and refers to any form of communication including, but not limited to, voice communication, video communication, instant messaging, electronic mail exchange, and the like.

Figure 1:
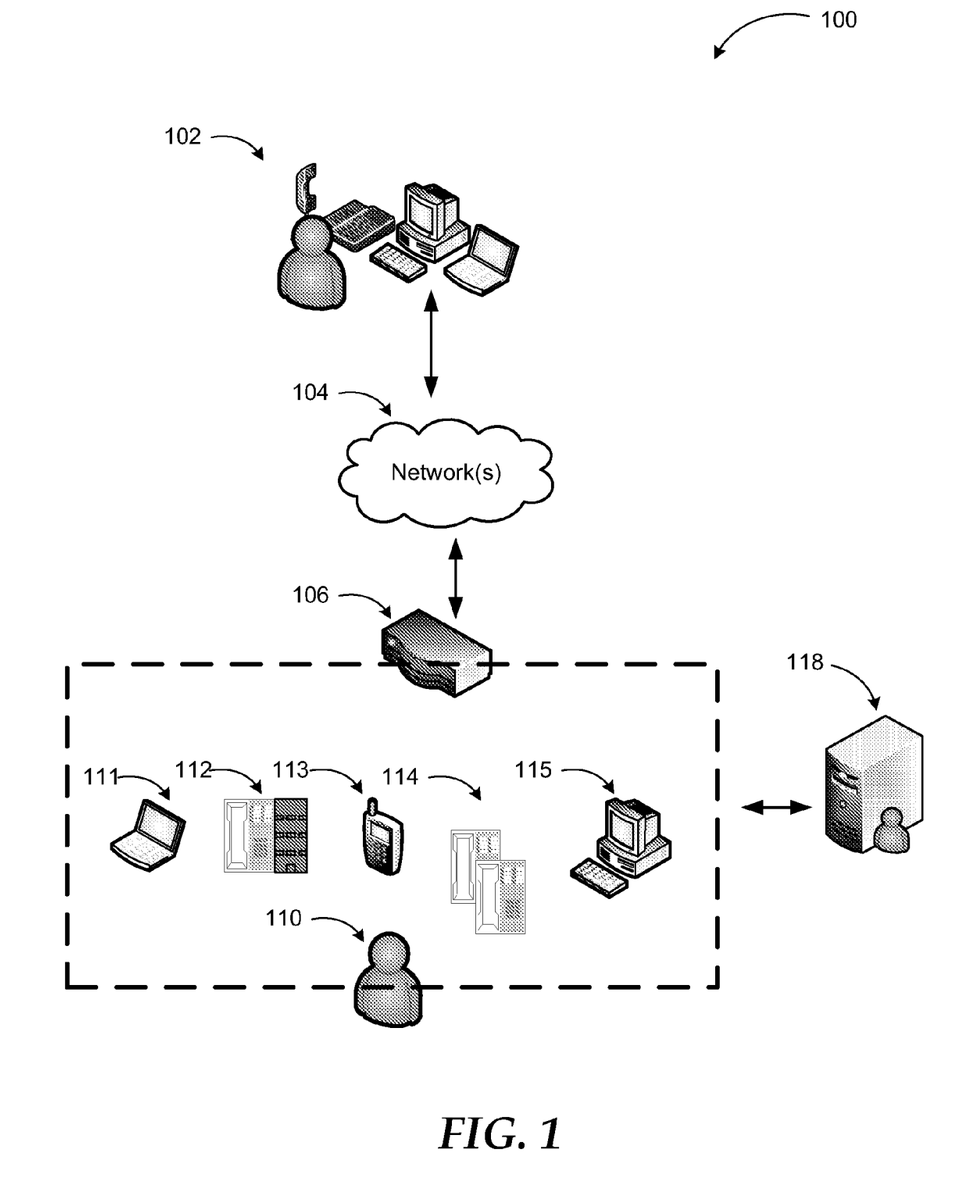
FIG. 1 is a conceptual diagram illustrating an example unified communication system, where a call may be delivered by context-based routing.

Referring to FIG. 1, diagram 100 of an example unified communication system, where a call may be delivered by context-based routing, is illustrated. Unified communication systems facilitate multi-modal communication between subscribers also enabling voice calls through external systems. In a unified communication system, a server manages routing and establishment of calls. Client applications provide subscribers user interfaces enabling them to receive detailed information about calling parties, call options, and selections for outgoing calls. Communications through a unified communication system may be voice, video, email, instant messaging, conferencing, etc. Furthermore, such a system may enable users to associate different modes of communications (e.g. instant messaging, email, and voice as part of a conversation) and associate various modes of communication with projects, calendar items, and so on, allowing the user to have an integrated communication experience.

In personal and work life, most people place importance on being able to answer voice calls because voice calls often have an urgency (less urgent matters can be handled through other means such as email), a purpose (typically callers have a specific purpose for placing the call), and they may be the only method for a caller to reach them (i.e. the phone number may be the only published address for the called party).

Various approaches have been implemented in the past to route voice calls to a human when they cannot be answered by the primary called party. The purpose behind these approached is typically to allow the caller to talk to a human on the other end by taking a reasonable call routing decision based on various input parameters such as caller ID, time of the day, etc. These are called sometimes "Call Coverage" features in a typical PBX. For example, a PBX may have predefined rules such as:

Call forward on no answer.
Group pickup (assign a number of extensions that ring along with the primary called number).
Personal assistant (answer the voice call through an interactive voice system, and direct to another extension.

In order to route calls properly and efficiently communication systems need to understand the context of the call, e.g. what is the call regarding, which project the call is related to, whether it a social call or a business call, etc. Free form context is not processable by machines and hence traditional systems provide context collection and processing in the form of prompts/DTMF options. The prompts/DTMF options that are available typically require the caller to hear the options and select an option manually using a DTMF keypad.

For a subscriber of such a system, having to break from the unified communication experience and answer voice or DTMF prompts would disturb the integrity of the communication experience. In addition, generalized prompt-based systems typically do not allow dynamic, user-specific customization of call routing and result in a delayed establishment of the call while the caller is finding his/her way through the maze of voice or DTMF prompts.

In a system according to embodiments, the delay caused by the system's attempt to sort out the context of the call may be eliminated or significantly reduced by allowing the caller to select from the options for the user before the call is even made. Better routing decisions can be made by the system through the caller provided selection(s).

According to one embodiment, the called party may specify a form comprising rules for routing calls to the called party, which may be based on time of day, called party's schedule, caller identification, a context of the call (e.g. a project associated with the call or type of call). The form is published to the caller by the system enabling the caller's unified communication client application to present the caller with choices such as alternative numbers (addresses) of the called party, alternative contacts in place of the called party, and context of the call. The caller may then specify the context of the call via the form and based on this caller information, enabling the call to be more appropriately routed by the system.

The called party may also be a non-human according to some embodiments. For example, the called party may be an automated service/agent in a helpdesk environment. Thus, embodiments are not limited to human called parties. Furthermore, the above-mentioned form, which is discussed in more detail below, may be generated and provided through a client application associated with the called party or independent from the client application (e.g. a web-based form). The called party may not only specify rules for routing the call to a different destination, but may also be enabled to specify routing options for different forms of communication. For example, if the system is capable to route voice communication, video communication, and instant messaging, the called party may be able to specify where each form of communication (or combinations) may be routed to. Of course, the rules may combine any of the listed or additional aspects for a decision to route the incoming call. For example, a called party may define rules that combine a communication form with time of day (e.g. voice and instant messages between 9.00 am and 5.00 pm, instant messages only after 5.00 pm).

In FIG. 1, subscriber 110 is enabled to prepare a Context-based Call Routing Document (CCRD) that defines rules and options for routing calls to subscriber 110. Subscriber 110 may be reached (and may use) a number of end devices such as end device 112-115. UC server 118 managing the system may receive the CCRD and publish it to subscribers associated with subscriber 110 such as subscriber 102. The UC system may employ one or more networks (104) such as a Voice Over IP (VOIP) network.

When subscriber 102 indicates a desire to call subscriber 110, that subscriber's client application provides a form to the subscriber based on the published information allowing subscriber 102 to select among call destination choices (e.g. alternative addresses, people, etc.), communication methods (e.g. instant message instead of voice call), or provide context information (e.g. select among projects to associate the call with such as for Widget Project—call Contact team). The call is then placed through network 104 and routed by router 106, which may be a physical router, another server, and the like, based on the calling subscriber's choices.

In the user interface, context information for routing the call (e.g. Widget Team, Pilar Ackerman) may be actionable such as clickable links that activate one or more communications upon selection by the calling party.

According to another embodiment, the calling party may be a caller from an external system that does not accommodate unified communications. In that case, server 118 may be configured to provide and voice or DTMF prompt based menu to better route the call, although this would be a less efficient approach. Such a voice-based menu may mirror the form or even be based on recordings inserted into the form by the system.

UC server 118 may also provide registration, presence, and routing functionalities. Since the end devices can handle additional communication modes, UC server 118 is configured to provide access to these additional communication modes (e.g. instant messaging, video communication, etc.) through an access server. Access server may reside in a perimeter network and enable connectivity through the network with other users in one of the additional communication modes.

The UC system may also include an Audio/Video (A/V) conferencing server providing audio and/or video conferencing capabilities by facilitating those over an internal or external network, a mediation server mediating signaling and media to and from a PBX or cellular network.

Figure 2:
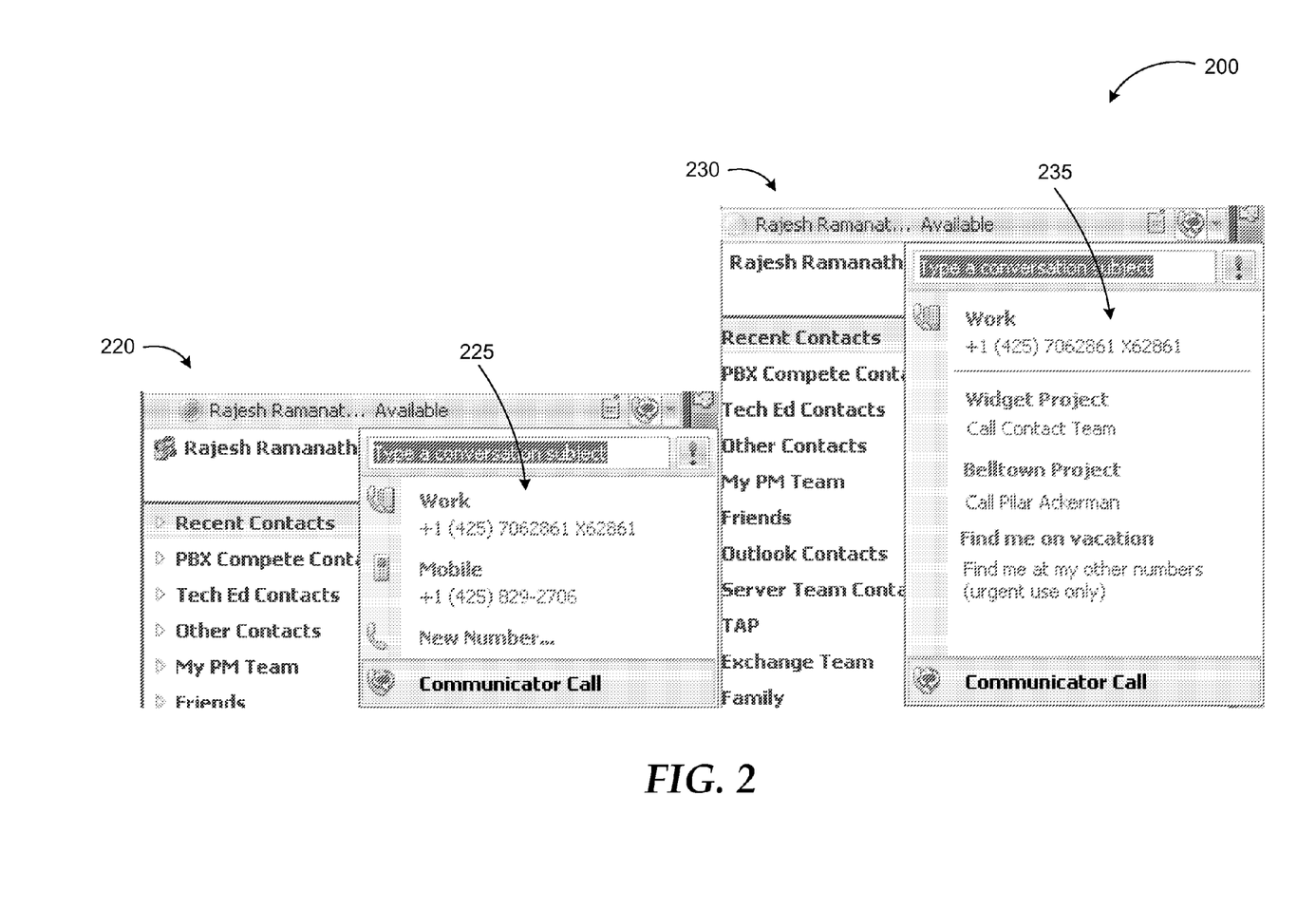
FIG. 2 illustrates example screenshots of a unified communication system client application facilitating a call through context-based routing.

FIG. 2 illustrates comparison of example screenshots of a unified communication system client application facilitating a call with and without context-based routing. First screenshot 220 illustrates a standard user interface (UI) for selecting a called party among groups of contacts such as recent contacts, other contacts, friends, etc. When the name of the called party is selected from the directory UI, a new window opens (second screenshot 225). The new window provides available numbers for the called party.

Screenshot 230 is the contact selection UI in a system according to embodiments. When a called party is selected, the new window 235 provides a preferred number provided by the called party (work number) and options for calling alternative contacts based on projects. If the calling party decides to call the provided number, a text entry box is provided for the calling party to input a conversation subject giving the called party a heads-up on the subject of the call. This way, the called party can elect to accept the call or forward it to voicemail, another party, etc.

An example system according to embodiments may have components in addition to the example mediation server, A/V server, and the like. Such a system may be implemented with other system configurations employing fewer or additional components. Functionality of a system enabling call routing based on context may also be distributed among the components of the system differently depending on component capabilities and system configurations.

Figure 3:
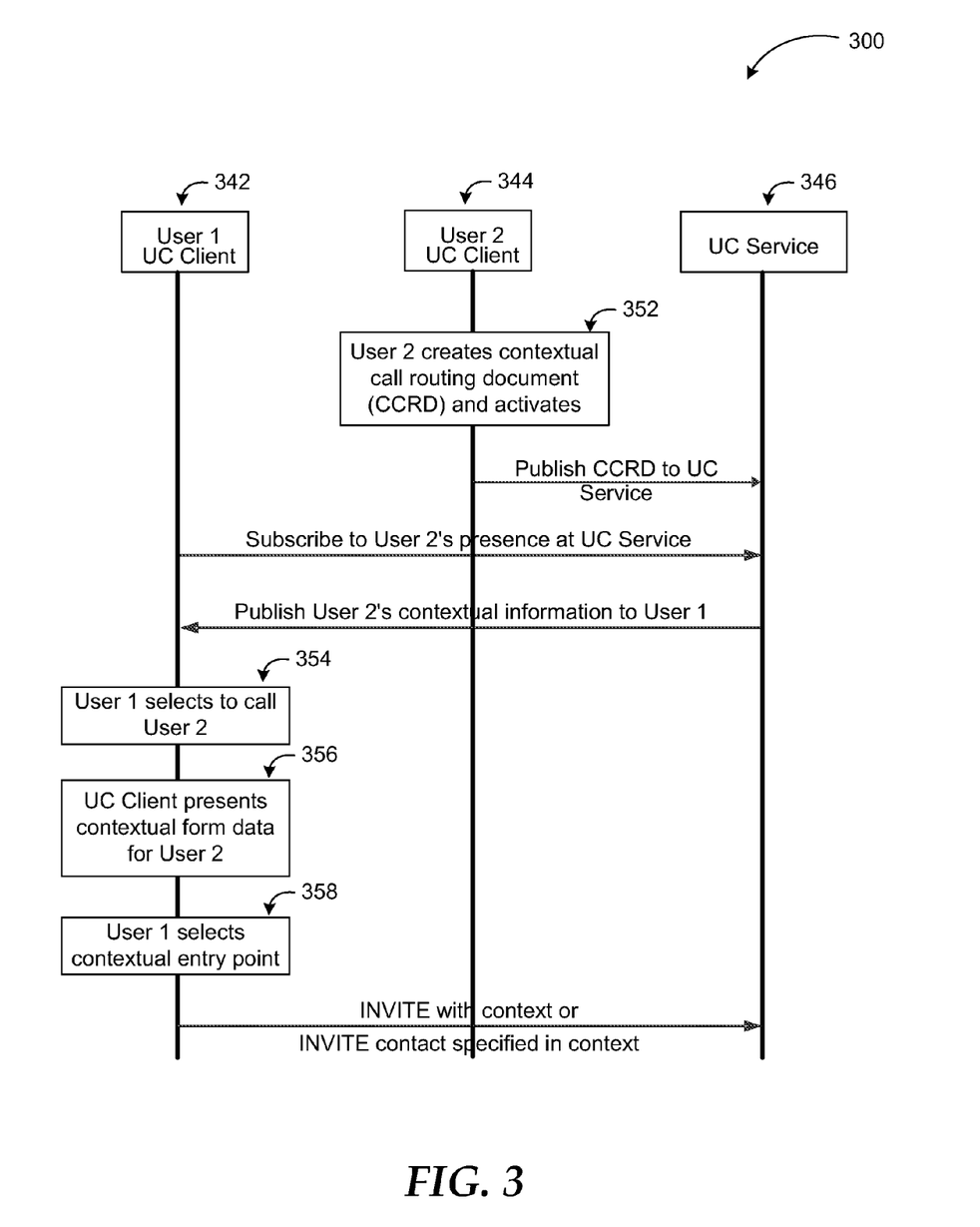
FIG. 3 is an action flow diagram illustrating actions in a unified communication system according to embodiments for a call being facilitated through context-based routing.

FIG. 3 is an action flow diagram illustrating actions in a unified communication system according to embodiments for a call being facilitated through context-based routing. In the action flow diagram, basic interactions between UC client 342 for user 1, UC client 344 for user 2, and UC service 346 are shown. UC service 346, which may be executed on a UC server or in a distributed manner over several servers.

Initially, UC client 344 enables user 2 to create the CCRD and activate it (352). The user may be allowed to create multiple CCRDs before having them published to the UC service 346. A CCRD may be generated for multiple callers, for a single caller, for different times of day, and so on. User 2 may also be enabled to modify the CCRD at any time. Moreover, a system according to one embodiment may employ machine learning algorithms to learn from the user's input and generate additional rules and options or create CCRDs for other callers based on one created by the user for one caller (e.g. a CCRD for a team member may be used as a template by the system to create CCRDs for other team members).

The CCRD is then published to the UC service 346. When user 1 subscribes to user 2's presence at UC service 346, the UC service publishes the contextual information from user 2 to user 1's UC client 342 enabling that application to generate a form for user 1.

When user 1 selects to place a call to user 2 through his/her client 342 (354), UC client 342 presents the contextual data for user 2 (e.g. alternative contacts, context information choice or entry, alternative communication modes) to user 1 (356). User 1 selects contextual entry point (358) choosing a destination address, providing context info, etc. UC client 342 then sends an Invite with context information to UC service 346 for user 2 or for an alternative contact.

The operations and approaches, as well as components of the communication systems employing context-based routing, described in FIG. 1-3 are exemplary for illustration purposes. A communication system with context-based routing may be implemented using additional or fewer components and other schemes using the principles described herein.

Figure 4:
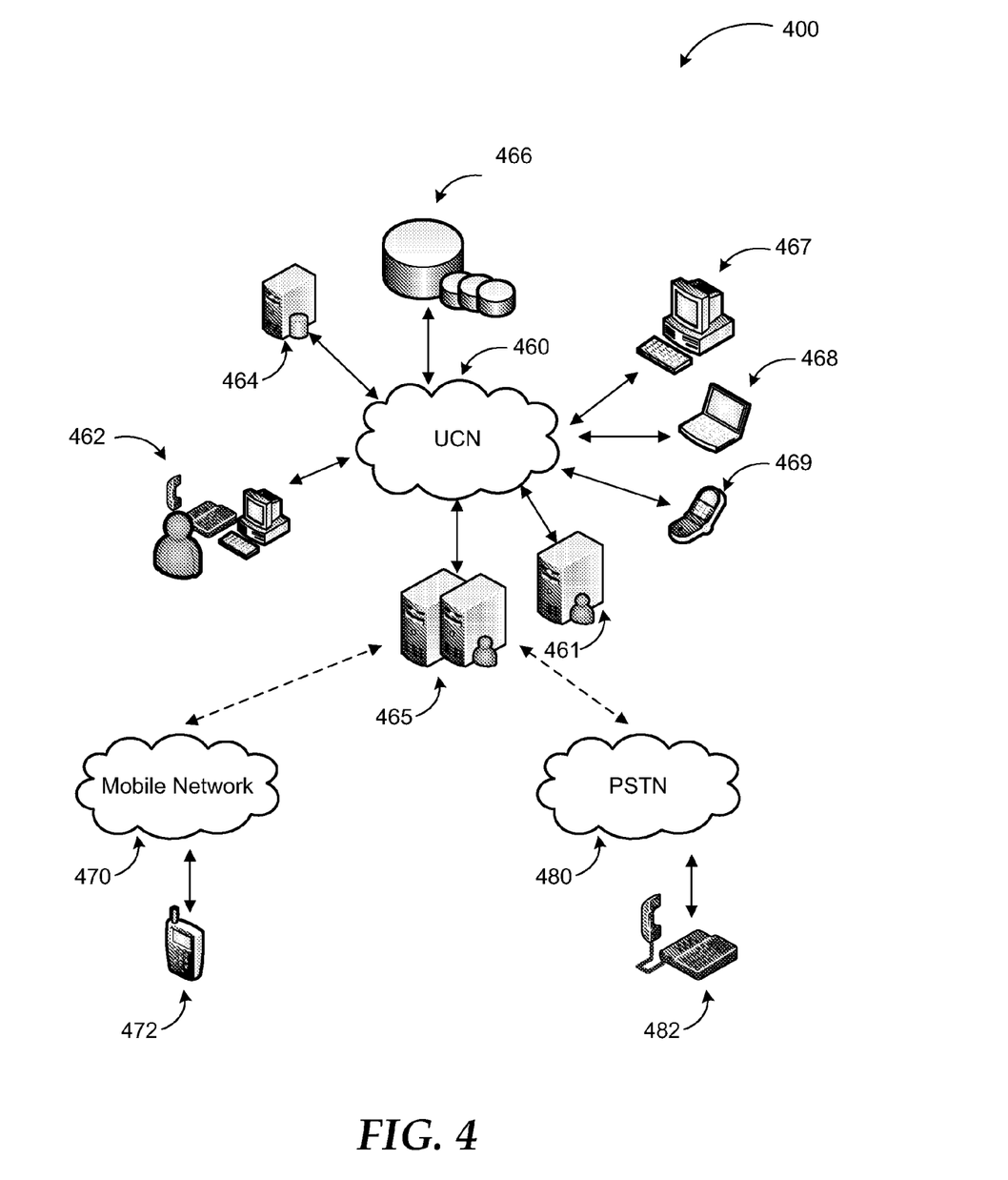
FIG. 4 illustrates a networked environment where embodiments may be implemented.

FIG. 4 is an example networked environment, where embodiments may be implemented. A unified communication system employing context-based routing may be implemented locally or in a distributed manner over a number of physical and virtual clients and servers. Such a system may also involve multiple distinct networks such as PSTN 480, Mobile Network 470, and UCN 460. At least one of the systems may be implemented in un-clustered systems or clustered systems employing a number of nodes communicating over one or more networks.

A system according to embodiments may comprise any topology of servers, clients, Internet service providers, and communication media. Also, the system may have a static or dynamic topology. The term "client" may refer to a client application or a client device. While a context-based routing system may involve many more components, typical and relevant ones are discussed in conjunction with this figure.

Mediation server(s) 465 may provide signaling and media exchange between different systems such as calls between cellular phone 472 and UC clients 467-469 through mobile network 470 and UCN 460 or calls between phone 482 and UC clients 467-469 through PSTN 480 and UCN 460. UC server 461 may be configured for registering, routing, and other functionality including publication of CCRDs to subscribers and routing of the calls following the context-based choices made by the caller and the calling party. Data associated with the system configuration (e.g. user names, phone numbers, call policies, configuration, records, etc.) may be stored in one or more data stores such as data stores 466, which may be directly accessed by the servers and/or clients of the system or managed through a database server 464. The backbone of the UC system may be provided by a UC network (UCN) 460, which may employ a number of protocols such as SIP, RTP, and the like. UC clients 467-469 provide platforms for UCN user end points. Users such as user 462 may access the communication system using a client device or one or more client applications running on a client device.

UCN 460 may include a secure network such as an enterprise network, an unsecure network such as a wireless open network, or the Internet. UCN 460 provides communication between the nodes described herein. By way of example, and not limitation, UCN 460 may include wired media such as a wired network or direct-wired connection, and wireless media such as acoustic, RF, infrared and other wireless media.

Many other configurations of computing devices, applications, data sources, data distribution systems may be employed to implement a unified communication system with context-based routing. Furthermore, the networked environments discussed in FIG. 4 are for illustration purposes only. Embodiments are not limited to the example applications, modules, or processes.

Figure 5:
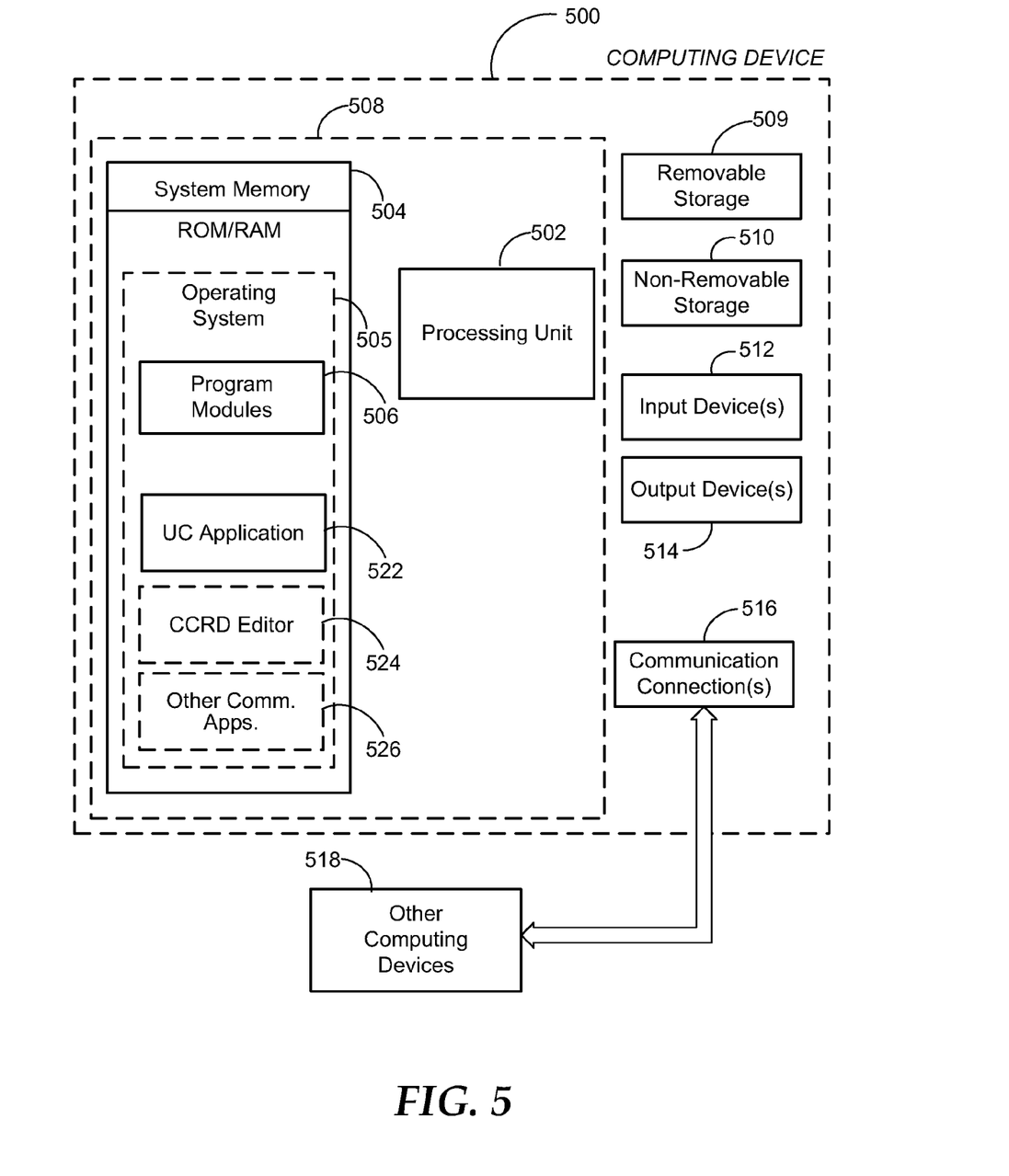
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment is illustrated, such as computing device 500. In a basic configuration, the computing device 500 may be a client device executing a UC client application for facilitating context-based routing in UC calls. Computing device 500 may typically include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the computing device, such as the WINDOWS® operating systems from MICROSOFT CORPORATION of Redmond, Wash. The system memory 504 may also include one or more software applications such as program modules 506, UC application 522, optional CCRD editor 524, and optional other communication applications 526.

UC application 522 may be a separate application or an integral module of a hosted service application that provides advanced communication services through computing device 500. As discussed above, UC application 522 may coordinate notification of incoming calls from various sources, present the user with a form for making context-based selections for a called party, and facilitate establishment of the call through context-based routing.

UC application 522 may also provide advanced functionalities of the UC system to the user such as those associated with other forms of communication (video, instant messaging, etc.). Optionally, other communication forms may be facilitated by other communication applications 526 in coordination with UC application 522. Optional CCRD editor 524 may be provided for enabling the user to create the document for publication to the UC service such that callers to this user can provide context information and make selections for context-based routing of the call. This basic configuration is illustrated in FIG. 5 by those components within dashed line 508.

The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer storage media may include volatile and non-volatile, removable and non-removable media implemented in any method or technology for storage of information, such as computer readable instructions, data structures, program modules, or other data. System memory 504, removable storage 509 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of device 500. Computing device 500 may also have input device(s) 512 such as keyboard, mouse, pen, voice input device, touch input device, etc. Output device(s) 514 such as a display, speakers, printer, etc. may also be included. These devices are well known in the art and need not be discussed at length here.

The computing device 500 may also contain communication connections 516 that allow the device to communicate with other computing devices 518, such as over a wireless network in a distributed computing environment, for example, an intranet or the Internet. Other computing devices 518 may include client devices of a UC network as discussed above. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
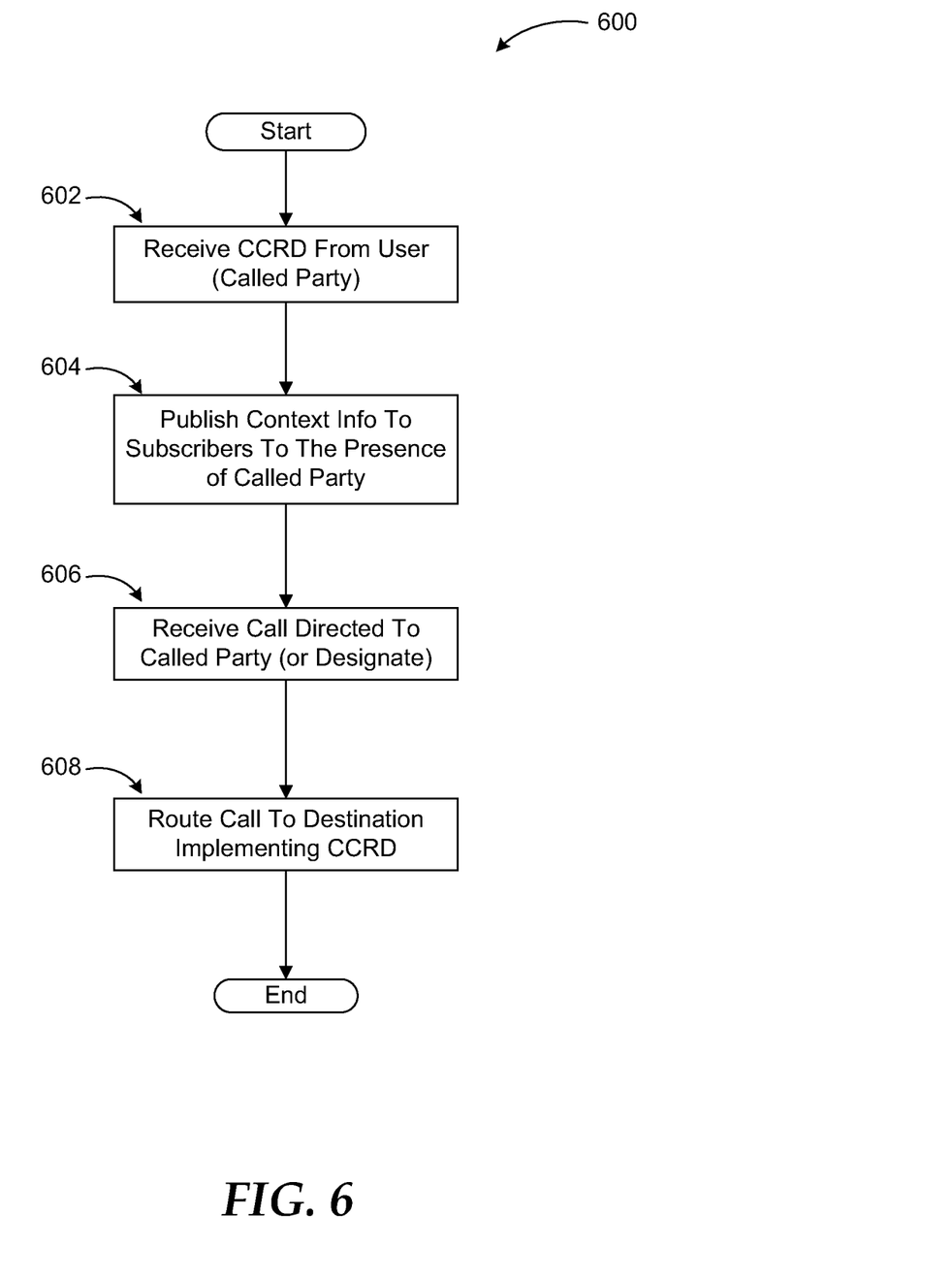
FIG. 6 illustrates a logic flow diagram for a process of managing context-based call routing in a unified communication system according to embodiments.

FIG. 6 illustrates a logic flow diagram for process 600 of managing context-based call routing in a unified communication system according to embodiments. Process 600 may be implemented in a unified communication service managing unified communication calls employing context-based routing.

Process 600 begins with operation 602, where the service receives a CCRD prepared by a subscriber from the client application of the subscriber. Processing advances from operation 602 to operation 604.

At operation 604, UC service publishes the context information to subscribers associated with a presence of the subscriber providing the CCRD. Client applications of those subscribers are enabled to present context-based selection forms to the subscribers when they wish to place a call to the subscriber providing the CCRD. Each of those forms may be customized based on the calling party. The forms include alternative contacts, addresses, etc. based on context, and input for the calling parties to provide a subject of their call. Processing continues to operation 606 from operation 604.

At operation 606, a call request (e.g. in form of an Invite) for the subscriber providing the CCRD or its designate depending on a selection of the calling party. Processing advances to operation 606 from operation 608.

At operation 608, the call is routed to the requested destination implementing the CCRD. Because the calling party is asked to provide a subject for the call, the called party still has a choice to forward the received call to another destination. If the calling party does not provide a subject for the call, the context of the call may still be determined by the system based on caller's identification, other choices made on the form, and the like, and provided to the called party. After operation 608, processing moves to a calling process for further actions.

The operations included in process 600 are for illustration purposes. Context-based routing in communication systems may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above.

Rather, the specific features and acts described above are disclosed as example forms of implementing the claims and embodiments.

What is claimed is:

1. A method for facilitating communications employing context-based call routing, the method comprising:
receiving, by a computing device, a context-based call routing information from a client application associated with a first subscriber specifying an alternative contact, a context selection, and a time-based rule;
in response to receiving the context-based call routing information from the client application associated with the first subscriber, publishing context information based on the context-based call routing information to a second subscriber;
receiving, by the computing device, a request for a call from a client application associated with the second subscriber based on a context-based call routing form that includes the alternative contact based on context information and a subject of the call to be placed to the first subscriber, the request including a text box allowing the second subscriber to input text describing the subject of the call; and
in response to receiving the request for the call from the client application associated with the second subscriber to one of the first subscriber and the alternative contact, routing the call according to the request.

2. The method of claim 1, wherein the context-based call routing information is based on presence information associated with the first subscriber, a time of day, a day of week, a schedule of the first subscriber, an identification of the second subscriber, and a list of context items provided by the first subscriber.

3. The method of claim 1, further comprising:
publishing context information to a third subscriber by employing machine learning techniques to dynamically modify the published context information based on the context information provided for the second subscriber.

4. The method of claim 1, wherein the context-based call routing information includes at least one from a set of: calendar information indicating availability of the first subscriber, a mapping link for indicating a location of the first subscriber, and routing options based on an available communication type.

5. The method of claim 1, further comprising:
if the second subscriber does not provide the subject of the call, determining a context of the call from selections made on the context-based call routing form by the second subscriber; and
providing the context of the call to the first subscriber along with a call request indication.

6. The method of claim 5, further comprising:
enabling the first subscriber to forward the call to one of: an answering system and another human operator upon reviewing an identity of the first subscriber and the context of the call.

7. The method of claim 1, further comprising:
in response to receiving a call for the first subscriber from a caller employing a system incapable of processing the context-based call routing form, presenting the caller with at least one of: a voice prompt menu and a Dual Tone Multi-Frequency (DTMF) menu for providing context information;
collecting the context information provided by the caller; and
presenting the collected context information to the first subscriber along with a call request indication, wherein the voice prompt menu mirrors the context-based call routing form and is generated from recordings within the context-based call routing form.

8. The method of claim 1, further comprising:
enabling the client application for the second subscriber to dynamically modify the context-based call routing form based on an ability of the second subscriber to respond to the context-based call routing form and to select alternative contact options.

9. The method of claim 1, wherein the context-based call routing information further specifies at least one alternative communication method and is generated as a context-based call routing document employing a structured markup language.

10. The method of claim 9, wherein the at least one alternative communication method includes a video call, an instant message session, an email, and a conference call.

11. A computer-executable unified communications (UC) service managing multi-modal communications between users and facilitating communications employing context-based call routing, the UC service capable of performing actions comprising:
enabling, by a computing device, a first user to generate a context-based call routing document (CCRD) specifying an alternative contact, a context selection, a time-based rule, and an alternative communication method;
in response to receiving the CCRD from a client application associated with the first user, publishing context information based on the CCRD to a second user subscribing to a presence of the first user;
enabling a client application associated with the second user to present the second user a context-based routing form in response to receiving an indication for a call to be placed to the first user, wherein the context-based routing form includes the alternative contact based on context information, the alternative communication method, and an input for a subject of the call to be placed to the first user, the input including a text box allowing the second user to input text describing the subject of the call;
in response to receiving a request for the call from the client application associated with the second user to one of the first user and the alternative contact, routing the call according to the request;
generating another context-based routing form for a third user subscribing to the presence of the first user based on the CCRD provided for the second user; and
publishing the context-based routing form to a client application associated with the third user.

12. The UC service of claim 11, wherein the first user has a plurality of presences, and a distinct CCRD is used for each presence.

13. The UC service of claim 11, wherein the context selection for the CCRD is automatically determined from a set of a project, a calendar item, a personal item associated with the first user and a currently active software application on a first user's computing device.

14. The UC service of claim 11, wherein service is capable of associating a plurality of communication forms such that the alternative communication method is presented in context with other associated communication methods, and wherein each communication method is activated upon selection of context information presented to the second user in the context-based routing form.

15. The UC service of claim 11, further comprising:
in response to receiving a call for the first user from a caller employing a system incapable of processing the context-based routing form, presenting the caller with at least one of: a voice prompt menu and a Dual Tone Multi-Frequency (DTMF) menu for providing context information, wherein the call is made from one of a cellular network and a Public Switched Telephone Network (PSTN);

collecting the context information provided by the caller; and presenting the collected context information to the first user along with a call request indication, wherein the call is established as a Voice Over IP (VoIP) call.

16. The UC service of claim 11, wherein the first user is enabled to redirect the call from the second user upon receiving the subject of the call, a method of communication, and an identity of the second user, wherein the CCRD is adjusted automatically based on display capabilities of a computing device utilized by the second user.

17. The UC service of claim 11, wherein the context-based routing form is dynamically modified based on at least one of: available communication methods to the second user and a permission level of the second user to access contact information.

18. A computer-readable storage device with instructions stored thereon for facilitating communications employing context-based routing, the instructions comprising:

receiving a context-based call routing document (CCRD) from a first user specifying an alternative contact, a context selection, a time-based rule, and an alternative communication method;

in response to receiving the CCRD from a client application associated with the first user, publishing context information based on the CCRD to a second user subscribing to a presence of the first user;

enabling a client application associated with the second user to present the second user a context-based routing form in response to receiving an indication for a call to be placed to the first user, wherein the context-based routing form includes the alternative contact based on context information, the alternative communication method, and an input for a subject of the call to be placed to the first user, the input including a text box allowing the second user to input text describing the subject of the call, and wherein the context-based routing form is dynamically modified based on a communication capability of the second user;

in response to receiving a request for the call from the client application associated with the second user to one of the first user and the alternative contact, routing the call according to the request;

if the second user does provide the subject of the call:
  presenting the text describing the subject of the call to one of the first user and the alternative contact; and
  allowing the first user or the alternative contact to accept or forward the call based on the text describing the subject of the call;

if the second user does not provide the subject of the call:
  determining a context of the call from selections made on the context-based routing form by the second user; and
  providing the context of the call to one of the first user and the alternative contact.

19. The computer-readable storage device of claim 18, wherein the context-based routing form is associated with a contacts list of the second user and alternative contacts and alternative communication methods are provided in the context-based routing form according to a priority defined by the first user.

20. The computer-readable storage device of claim 18, wherein the context for the context selection in the CCRD and a level of private information to be disclosed in the CCRD are automatically determined based on at least one from a set of: a social networking tool, an organizational hierarchy, and a work relationship between the first user and the second user.

* * * * *